(12) United States Patent
Gopalakrishnan et al.

(10) Patent No.: US 12,743,628 B2
(45) Date of Patent: Sep. 22, 2026

(54) ENHANCEMENT OF GENERATIVE IMAGE MODELS BASED ON GAZE

(71) Applicant: DOLBY LABORATORIES LICENSING CORPORATION

(72) Inventors: Subhadra Gopalakrishnan, Santa Clara, CA (US); Trisha Mittal, San Jose, CA (US); Jin Huang, Mishawaka, IN (US); Jaclyn Anne Pytlarz, San Jose, CA (US); Jake William Zuena, Sunnyvale, CA (US)

(73) Assignee: DOLBY LABORATORIES LICENSING CORPORATION

( * ) Notice: Subject to any disclaimer, the term of this patent is extended or adjusted under 35 U.S.C. 154(b) by 0 days.

(21) Appl. No.: 19/050,415

(22) Filed: Feb. 11, 2025

(65) Prior Publication Data

US 2025/0259063 A1 Aug. 14, 2025

Related U.S. Application Data

(60) Provisional application No. 63/553,406, filed on Feb. 14, 2024.

(51) Int. Cl.

| | |
|---|---|
| ***G06N 3/084*** | (2023.01) |
| ***G06F 3/01*** | (2006.01) |
| ***G06N 3/0464*** | (2023.01) |
| ***G06N 3/0475*** | (2023.01) |
| ***G06T 11/26*** | (2026.01) |

(52) U.S. Cl.
CPC ............ *G06N 3/084* (2013.01); *G06F 3/013* (2013.01); *G06N 3/0464* (2023.01); *G06N 3/0475* (2023.01); *G06T 11/26* (2026.01)

(58) Field of Classification Search
CPC .... G06N 3/084; G06N 3/0464; G06N 3/0475; G06F 3/013; G06T 11/206
See application file for complete search history.

(56) References Cited

U.S. PATENT DOCUMENTS

| | | | | |
|---|---|---|---|---|
| 10,482,600 | B2 * | 11/2019 | Zhou | G06N 3/0464 |
| 11,440,473 | B2 | 9/2022 | Murakami | |
| 11,450,095 | B2 | 9/2022 | Anderton-Yang | |
| 2016/0179201 | A1 * | 6/2016 | Anderson | G06F 3/013 345/156 |
| 2019/0220977 | A1 * | 7/2019 | Zhou | G06N 3/09 |
| 2019/0286950 | A1 * | 9/2019 | Kiapour | G06F 16/532 |

(Continued)

OTHER PUBLICATIONS

Banerjee et al., "Legan: Disentangled Manipulation of Directional Lighting and Facial Expressions Whilst Leveraging Human Perceptual Judgements," Proceedings of the IEEE/CVF Conference on Computer Vision and Pattern Recognition, perceparXiv:2010.01464v3 [cs.CV] Jun. 18, 2021, pp. 1-21.

(Continued)

*Primary Examiner* — Afroza Chowdhury

(57) ABSTRACT

A system may display a set of images to a user, the set of images includes a plurality of synthetic images output by a generative adversarial network (GAN) includes a generator and a discriminator, and a plurality of non-synthetic images, detect a user response to the set of images, the user response includes at least a gaze of the user relative to the set of images, and train the GAN based at least on the user response, including tuning the generator based on the gaze of the user.

19 Claims, 6 Drawing Sheets

(56) References Cited

U.S. PATENT DOCUMENTS

| | | | | |
|---|---|---|---|---|
| 2020/0004333 | A1* | 1/2020 | Lee | G06F 3/04845 |
| 2021/0097644 | A1* | 4/2021 | Sommerlade | G06T 5/73 |
| 2021/0104313 | A1 | 4/2021 | Mizobe | |
| 2021/0256353 | A1* | 8/2021 | Nilsson | G06N 3/094 |
| 2022/0126864 | A1 | 4/2022 | Moustafa | |
| 2022/0276703 | A1* | 9/2022 | Kim | G06N 3/0464 |
| 2023/0015117 | A1 | 1/2023 | Aberman | |
| 2023/0020454 | A1 | 1/2023 | Shchur | |
| 2023/0036068 | A1 | 2/2023 | Gurevich | |
| 2023/0059954 | A1 | 2/2023 | Taesuh | |
| 2023/0100740 | A1 | 3/2023 | Malur Srinivasan | |
| 2023/0222687 | A1 | 7/2023 | Duraiswami | |
| 2023/0281885 | A1* | 9/2023 | Park | G06V 10/94 345/156 |
| 2023/0316590 | A1 | 10/2023 | Singh | |

OTHER PUBLICATIONS

Boyd et al., "CYBORG: Blending Human Saliency Into the Loss Improves Deep Learning-Based Synthetic Face Detection," in 2023 IEEE/CVF Winter Conference on Applications of Computer Vision (WACV), Waikoloa, HI, USA, 2023 pp. 6097-6106. doi: 10.1109/WVACV56688.2023.00605, arXiv:2112.00686v3 [cs.CV] Aug. 17, 2022, pp. 1-22.

Bozkir et al., "Regressive Saccadic Eye Movements on Fake News," 2022 Symposium on Eye Tracking Research and Applications (ETRA '22). Association for Computing Machinery, New York, NY, USA, Article 7, 1-7. https://doi.org/10.1145/3517031.3529619, pp. 1-7.

Crum et al., Teaching AI to Teach: Leveraging Limited Human Salience Data Into Unlimited Saliency-Based Training, arXiv:2306.05527v1 [cs.CV] Jun. 8, 2023, pp. 1-12.

Goodfellow et al., "Generative Adversarial Nets," Advances in neural information processing systems, 27, arXiv:1406.2661v1 [stat.ML] Jun. 10, 2014, pp. 1-9.

Karras et al., "A Style-Based Generator Architecture for Generative Adversarial Networks," In Proceedings of the IEEE/CVF conference on computer vision and pattern recognition, arXiv:1812.04948v3 [cs.NE] Mar. 29, 2019, pp. 1-12.

Karras et al., "Alias-Free Generative Adversarial Networks," Advances in Neural Information Processing Systems, 34, arXiv:2106.12423v4 [cs.CV] Oct. 18, 2021, pp. 1-31.

Lago et al., "More Real Than Real: A Study on Human Visual Perception of Synthetic Faces," IEEE Signal Processing Magazine, vol. 39, No. 1, pp. 109-116, Jan. 2022, doi: 10.1109/MSP.2021.3120982, arXiv:2106.07226v2 [cs.CV] Oct. 20, 2021, pp. 1-15.

Lutz et al., "Affective Information Processing of Fake News: Evidence from NeuroIS," Information Systems and Neuroscience. Lecture Notes in Information Systems and Organisation, vol. 32. Springer, Cham. https://doi.org/10.1007/978-3-030-28144-1_13, pp. 1-21.

Ronneberger et al., "U-Net: Convolutional Networks for Biomedical Image Segmentation," In Medical Image Computing and Computer-Assisted Intervention—MICCAI 2015: 18th International Conference, Munich, Germany, Oct. 5-9, 2015, Proceedings, Part III 18, Springer International Publishing, arXiv:1505.04597v1 [cs.CV] May 18, 2015, pp. 1-8.

Schonfeld et al., "A U-Net Based Discriminator for Generative Adversarial Networks," In Proceedings of the IEEE/CVF conference on computer vision and pattern recognition, arXiv:2002.12655v2 [cs.CV] Mar. 19, 2021, pp. 1-24.

Tatlet, Benjamin W., "The central fixation bias in scene viewing: Selecting an optimal viewing position independently of motor biases and image feature distributions," Journal of Vision, 2007. 7(14); 4, Nov. 19, 2007, https://doi.org/10.1167/7.14.4, pp. 1-17.

* cited by examiner

ENHANCEMENT OF GENERATIVE IMAGE MODELS BASED ON GAZE

CROSS-REFERENCE TO RELATED APPLICATIONS

The present application claims the benefit of priority to U.S. Provisional Patent Application No. 63/553,406, filed on Feb. 14, 2024, which is incorporated herein by reference in its entirety.

BACKGROUND

Generative artificial intelligence (AI) is a type of artificial intelligence that creates new content. This synthetic (non-human generated) content can include text (e.g., literary works), images, music, audio, and videos. Generative AI may use machine learning techniques performed by computers to produce synthetic content that resembles a particular target distribution. Generative AI may include algorithms that learn from patterns, trends, and relationships within the training data to generate the synthetic content.

Generative AI models are growing in popularity and have widespread use cases for both personal and business applications. Generative AI models have made remarkable progress in generating highly realistic images and they have been improved in various aspects such as, for example, in architecture, dataset quality, and data augmentation methods.

BRIEF DESCRIPTION OF THE DRAWINGS

Aspects of the present disclosure are illustrated by way of example and not limitation in the figures of the accompanying drawings in which like references indicate similar elements.

DETAILED DESCRIPTION

Figure 1:
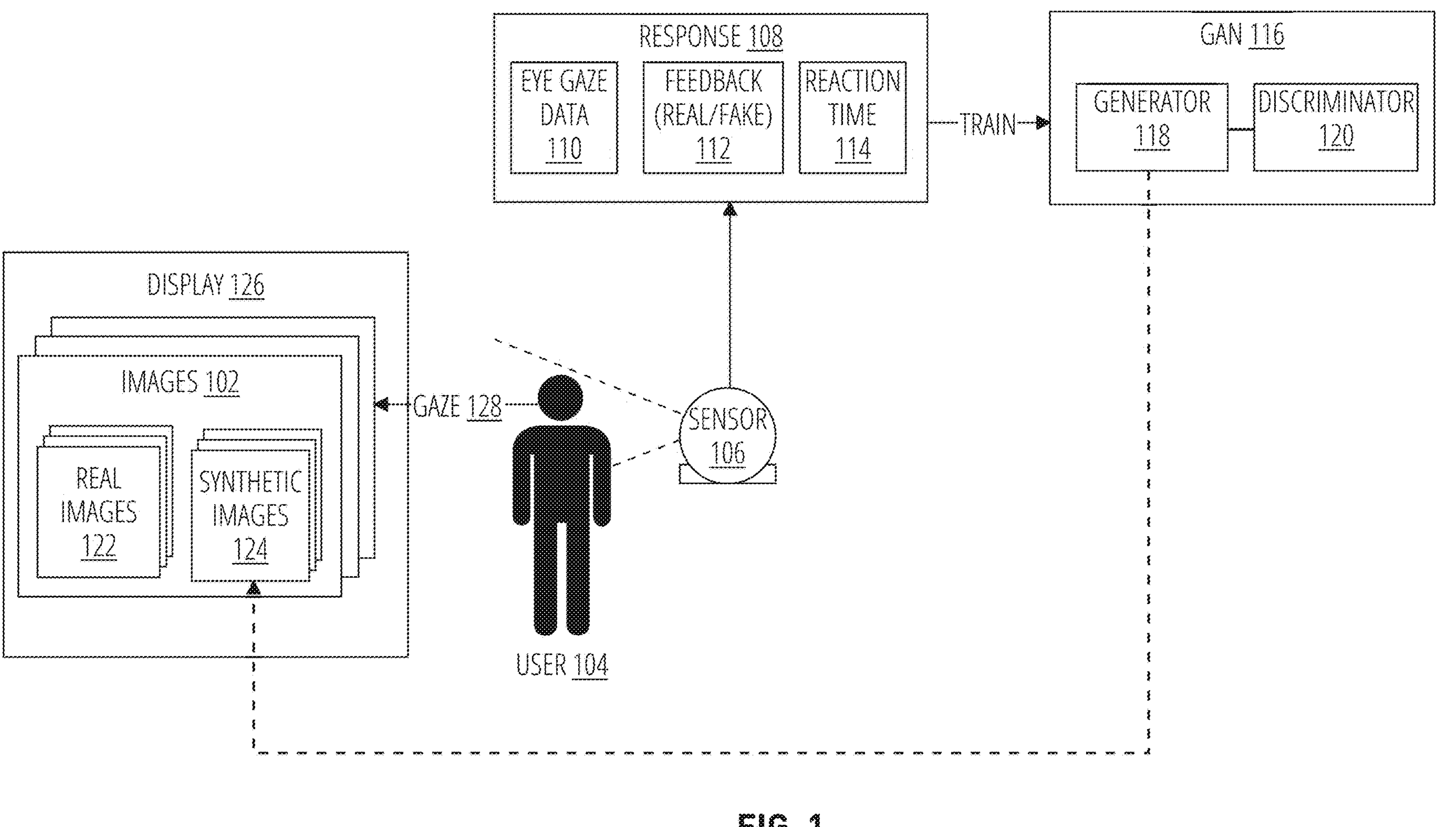
FIG. 1 shows an example system for improving a generative adversarial network (GAN) with human in the loop (HITL), in accordance with one or more embodiments.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Machine learning is a type of artificial intelligence (AI) that uses algorithms to create models that allow machines to perform tasks. These tasks can include categorizing images, analyzing data, or predicting price fluctuations. Machine learning uses a variety of algorithms that iteratively learn from data to improve, describe data, and predict outcomes. Through training, machine learning models adapt how they process data (inputs) to learn how to better generate a desired output, rather than being hardcoded to perform an explicit operation in view of a given input.

Generative adversarial networks (GANs) are a form of machine learning, and are useful for generating synthetic data, such as synthetic yet realistic images. In the case where a GAN is generating image-like content, a 'synthetic' image may be understood as an image generated by the GAN. These synthetic images mimic realistic lighting, surface textures, shape, and form of objects and environments that are present in physical reality. To generate synthetic data, a GAN includes a generator machine learning model (which is referred to as a generator) and a discriminator machine learning model (which is referred to as a discriminator). The GAN trains the generator and discriminator in what is referred to as an adversarial setting, to train the generator to 'trick' the discriminator, and train the discriminator to detect whether an input image is synthetic or not.

In traditional systems, GAN-based image generation models strive to create realistic images by creating data samples (synthetic images) that match the target distribution of real images. The adversarial architecture of the GAN indirectly trains the GAN to generate samples that humans often see as being realistic. While this has achieved some success, there exists areas of improvement to perform realistic image generation, even better than that of traditional GANs, when the target distribution is matched optimally under traditional methods.

Some areas of improvement in traditional systems include where the 'real' dataset which is used as a target dataset is finite and limited. Humans have exposure to a much larger volume of real imagery and therefore have a much better understanding of the real world than traditional GANs are exposed to. Further, while the traditional GAN model tries to match the data distribution equally for all parts of an image, humans tend to notice certain parts of the image more than the rest. Current GAN models do not properly take this human saliency into account. Similarly, some regions of the image are less important to humans in discerning whether an image is real, and without taking this into account, traditional GANs may emphasize all regions equally.

Aspects described offer improvements over traditional systems. In some aspects, an improved GAN system utilizes human feedback to improve generative models. A pipeline is disclosed where human-in-the-loop (HITL) is used for improving generative models in the visual domain, specifically using eye and gaze tracking data. This data is then fed into the ML model (e.g., a GAN) for improved results. The HITL feedback may be repeated over time (e.g., periodically or continuously).

In aspects of the present disclosure, a system or method is described that enhances generative AI models, where those generative AI models are configured to generate synthetic images (e.g., realistic images). In particular, aspects described utilize human-in-the-loop (HITL) training for a ML model, based on eye tracking data that improves the performance and realism of generative machine learning models. This data may be fed into the ML model for improved results and could be repeated continuously.

The system and method may include operations such as obtaining data for human labeling that include both a real dataset (photographs of a real object) and a fake dataset (synthetically generated images of the same object). The real dataset may contain images from the target distribution (e.g., a 'face' of a baby, a tree, an automobile, a house, etc.). The 'fake' dataset are the synthetic images generated from a GAN (e.g., the same GAN to be tuned). The system may access a fully trained GAN for generating images in a target distribution and ask a human to rate the images by providing a response as to whether each image is fake (e.g., a synthetic image generated by an ML model of the target distribution) or real (e.g., a photographic image of the target distribution). The system may record eye gaze and other human feedback. The system may use the human responses to generate a gaze saliency map. A gaze saliency map is an image with data overlaid on the image that highlights one or more locations on the image that a person's eyes gives focus to. The saliency map reflects the degree of importance of a pixel to the human visual system. The system may improve the GAN model using the map.

The system may include one or more pipelines to improve the GAN model. First, the system may use gaze data as gaze saliency map and then use the map to improve the GAN model. Second, the system may predict gaze saliency map as an auxiliary human response. The system may use these pipelines in the alternative, or in combination.

In one aspect, a method includes displaying a set of images to a user, the set of images comprising i) a plurality of synthetic images output by a generative adversarial network (GAN) comprising a generator and a discriminator, and ii) a plurality of non-synthetic images (e.g., real images capturing a member of the target distribution in the physical environment), detecting a user response to the set of images, the user response includes at least a gaze of the user relative to the set of images, and training the GAN based at least on the user response, including tuning the generator based on the gaze of the user.

In an embodiment, training the GAN based on the user response includes generating a plurality of maps associated with the gaze of the user relative to the set of images, and tuning the generator based on the plurality of maps. Tuning the generator based on the plurality of maps may include performing backpropagation which adjusts weights of the generator in view of a loss function that has increased penalty in one or more salient regions of the plurality of maps.

In an embodiment, the method further includes training a machine learning (ML) model with the user response and the set of images, the ML model being trained to receive an input image and generate as output, a map that predicts the gaze of the user relative to the input image, where training the GAN based on the user response includes performing backpropagation which adjusts weights of the generator in view of a loss function that increases penalty in one or more salient regions of the map.

In an embodiment, the user response further includes the feedback of the user indicating their impression on each image in the set of images, for example, whether each image is output by the GAN or not, or an amount of time for the user to provide the response for each image in the set of images, or both.

In an embodiment, the GAN includes a second discriminator, where the second discriminator is trained with the set of images and the user response to receive an input image and generate, as output, a prediction of the gaze of the user relative to the input image, and a predicted response of the user indicating whether the input image is generated by the generator. In an embodiment, training the GAN based on the user response may include providing as input to the discriminator and the second discriminator, images that are generated from the generator and real images not generated from the generator, and performing backpropagation which adjusts weights of the generator based on loss between the generator and the discriminator and based on loss between the generator and the second discriminator.

In an embodiment, the method may also include sensing, detecting, and/or collecting the user response to the set of images is performed at a first computing node, and the user response is received over a network at a second computing node where the GAN is trained. The method may be performed periodically to update the GAN using a plurality of user responses.

Other technical features may be readily apparent to one skilled in the art from the following figures, descriptions, and claims.

FIG. 1 shows an example system 100 for improving a generative adversarial network (GAN) with human in the loop (HITL), in accordance with one or more embodiments.

The system 100 displays a set of images 102 (e.g., on a display 126) to a user 104. The display 126 may comprise a digital display (e.g., a computer monitor, a touchscreen display, an LED or LCD display, etc.). The set of images 102 may include a plurality of first images (e.g., synthetic images 124).

Synthetic images 124 may be output by a generative adversarial network (GAN) such as GAN 116. The set of images 102 also include a plurality of second images (e.g., real images 122) that are not synthetic. These real images 122 may be photographic images of a target distribution. As described, the target distribution may be any object such as a human, a human face, a body part, an animal, artwork, furniture, a vehicle, a building, clouds, trees, etc. The synthetic images 124 may be images sampled from the GAN 116 that is to be tuned, and those synthetic images 124 may be generated by the generator 118 aimed at the same target distribution.

The GAN 116 includes generator 118 and discriminator 120, each of which being their own machine learning models that are trained to receive a given input and generate an output. The generator 118 and the discriminator 120 are connected and trained in an 'adversarial' setting, in the sense that during training, the generator and discriminator networks compete with one another. The generator creates synthetic data samples (e.g., synthetic images 124) to trick the discriminator 120 into accepting the synthetic image as being authentic (e.g., not generated by the generator 118). In response to receiving input images (e.g., a mixed set of images such as images 102), the discriminator attempts to identify (through an output label), which data samples are real images and which are not. This process is repeated many times over to train the generator 118 to generate better outputs (that are not discernable from the non-synthetic images) and to train the discriminator 120 to better recognize which input images are synthetic images.

Architecture of GAN 116 may vary in GAN type, depending on application. Examples of GAN types include a CycleGAN, Super-resolution GAN, or other types of GAN. The generator 118 and discriminator 120 may comprise an artificial neural network (ANN).

In an example, generator 118 comprises a convolutional neural network (CNN). A CNN is an example of a deep learning algorithm that can process an input image, differentiate between the objects within it, and assign importance to differences and other features. The generator 118 is trained to create outputs to be mistaken for real (non-synthetic) data.

In an example, discriminator 120 comprises a CNN, or other neural network. The discriminator 120 may be trained to identify discriminating features between the real and synthetic images. The discriminator is trained to identify which received output is artificial, and generate an output (e.g., a label) indicating whether the input (e.g., an image from images 102) is synthetic or real.

Generally, the generator 118 may produce synthetic image samples (e.g., 124) as outputs. The generator 118 may improve the quality of the synthetic image samples in its effort to convince the discriminator 120 that these synthetic images are real images. The discriminator 120 determines whether an image, as a whole, is real or synthetic. As a result, through multiple training iterations, the generator 118 learns to generate a synthetic image 124 that incorporates the statistical properties of a real image 122 for a given target distribution.

The system 100 may detect (e.g., sense) a user response 108 to the set of images 102. The user response 108 may include at least a gaze 128 of the user 104. This gaze may be determined relative to the set of images 102. For example, for each image in the image set, the system 100 may use one or more sensors 106 to track eye position, eye movement and/or eye direction of user 104. Based on this tracking, system 100 may determine where gaze 128 of the user 104 falls on for a given image. The coordinates and path of this gaze may be different for each image, depending on where the users are fixed for a given image, for how long the gaze is fixed at each region, and the sequence of the movement (e.g., where the user looked at first, second, etc.).

System 100 may include one or more eye tracking algorithms that process the raw eye gaze data 110 to extract useful eye data. The human eye executes a number of movements, including fixations, saccades, and smooth pursuit. Fixations occur when the eye stops to collect visual data. Although the duration of one is highly variable, the longer a fixation is, the more visual information is processed. Saccades are fast jumps that the eye performs between fixations. Smooth pursuit is the eye movement that takes place when looking at an object in motion and following it. As visual intake is possible during smooth pursuit, the movement is relevant for tracking eye movements. System 500 may detect (e.g., sense) and store fixations, saccades, smooth pursuit, as well as other data (e.g., pupil size). Sensor 106 may comprise sensing light reflecting off the user's eyes, in particular, the user's pupil. The sensor may include an infrared camera or other light sensor that records the reflection. Generally, the algorithms may delimit the center of the pupil and deduce eye rotation to determine current gaze direction. The eye tracking algorithms may include pupil center corneal reflection (PCCR) algorithm, or other eye tracking algorithm. The gaze may then be projected onto the displayed image to determine and store coordinates on the image that the gaze fell upon, and this combination of data (where the gaze fell upon, the sequence describing where the gaze fell over time and for how long) may be stored as raw eye gaze data 110.

In an embodiment, the system may present the user 104 with an option to select whether the current displayed image is a real image (e.g., from real images 122) or generated by GAN 116 (synthetic images 124). The system 100 may receive user feedback 112 (e.g., a button press, an audio input sensed from a microphone, a touchscreen input, a keyboard input, a nod or gesture, etc.) that indicates whether the user believes the current displayed image to be real or synthetic. The system 100 may also track and store a reaction time 114 which may be the time taken by the user to provide feedback (real/fake) 112. A longer time may indicate that the user 104 is less sure of their decision, which may provide an indication that the GAN 116 is generating high quality synthetic images 124 which are deceptive to the user 104.

The system 100 uses the response 108 to further train GAN 116. The system 100 tunes the generator 118 based on the gaze of the user. In the case of a neural network, training a GAN 116 may include modifying weights that join nodes between layers of the neural network of the generator 118 and/or discriminator 120. These weights represent strength of connections between node of the neural network that ultimately determine how the neural network produces an output based on an input. Further, training GAN 116 may use this response 108 to modify weights of a loss function that, during backpropagation, modifies the weights of the respective generator and discriminator to minimize or reduce the loss of the loss function, as described in other sections.

Generally, the training of GAN 116 may be performed in a zero-sum game fashion where in every iteration of calculating a loss function for an input/output, the generator 118 maps a latent space sample image from a source distribution to the desired target distribution to generate a synthetic image. This sample (a synthetic image) is then sent to the discriminator 120 that classifies whether the obtained sample is real/fake. The generator is trained (e.g., by adjusting its internal weights) to maximize the probability that the discriminator predicts the generated data sample as real. As training progresses and the discriminator 120 learns to better classify real/fake data samples, the generator 118 learns to generate more realistic data samples that reduce the discriminator accuracy.

Once trained, the GAN 116 may receive input to generate images from the target distribution (e.g., a human male face) and generate synthetic images 124. Real images 122 may be real images from that target distribution (e.g., photos of male faces). The user 104 is then sensed while looking at a mix of these images (122, 124) and responding whether each is 'real' or 'fake'.

In an embodiment, the generator and discriminator objectives are as follows:

Generator objective:

$$\min_G L_G = -\sum_Z \log(D(G(z))) \qquad (1)$$

Discriminator objective:

$$\min_D L_d = -\sum_{x,z} (\log(D(x)) + \log(1 - D(G(z)))), \quad (2)$$

where,

- z—latent space sampled from a source distribution (usually Gaussian)
- G—Generator network
- D—Discriminator network
- x—sample from target distribution (real images)

For image generation models such as GAN 116, the generator 118 maps a simpler latent distribution (e.g., a Gaussian) into the more complicated target distribution of real images. Usually, these generator and discriminator models for image generation are built using Convolutional Neural Networks (CNNs).

System 100 may acquire human feedback for our continuous training process. The data could either be collected ahead of time and used to finetune an algorithm, or could be live continuous training depending on the application.

In an embodiment, GAN 116 is a fully trained GAN that is trained to generate synthetic images 124 to mimic a target distribution (e.g., a human face, a plane, an automobile, etc.). The system 100 may be agnostic to the model architecture. For example, a pretrained model like styleGAN can be utilized or an untrained GAN can be trained. System 100 obtains real images 122 belonging to the same target distribution which could be sourced from the same dataset used for training the GAN 116, or a similar dataset with no noticeable distribution shift from the target dataset, including but not limited to an existing dataset, online crawling from websites and so on.

In an embodiment, system 100 displays the images 102 to user 104 sequentially and randomly, so that the user 104 does not know whether the current shown image is from real images 122 or synthetic images 124. System 100 prompts user 104 for feedback as to whether the image is real or synthetic. System 100 may detect or collect the user 104 response (e.g., the eye gaze) and gather one or more of the following as feedback:

1. Human rating of realness vs. fakeness. This could be a binary 0/1 value or a more detailed rating of the image fakeness (e.g. from 1 to 5).
2. Their eye gaze data recorded as x and y coordinates on the display 126.
3. The response time taken for each image by every user.
4. Other helpful markers may include one or more of a facial expression, a heart rate, a galvanic skin response (GSR), etc.

When the system 100 detects multiple user responses for a single image, the system can average the responses, or treat each response separately, depending on the processing delay and timing. The system 100 may detect the user reaction time 114 which is a good indicator of the difficulty that a human has in detecting a fake image. The other helpful markers could look at facial expression to ascertain concentration, confusion, etc.

The system 100 may use the response 108 to finetune the GAN 116. The response 108 may be processed and used in two pipelines to finetune the GAN 116, as described. An example of each pipeline is shown, in FIG. 4 and FIG. 5. System 100 may include either of these pipelines, or both of the pipelines.

Generally, a machine learning model can be trained using a training dataset that includes many pairs of input and a desired output. These inputs and the desired output of the training data can be described as input-output pairs, and these pairs can be used to train the machine learning model in a process that may be understood as supervised training. The size of the dataset can vary depending on application.

As described, each of the machine learning models (e.g., a generator, a discriminator, etc.) described in the present disclosure may comprise an artificial neural network (e.g., a CNN, a DNN, etc.). An artificial neural network may include a plurality of layers, each layer containing a plurality of nodes which can be understood as artificial neurons. The nodes of an input layer can receive an input (e.g., a prompt, an image, etc.) and generate a desired output as trained. Each node can have an edge that connects the node to one or more nodes in a subsequent layer. Each edge can have a weight that determines the impact of the node towards the node of the subsequent layer that the node is connected to. Each layer can have such nodes with such edges that connect to one or more nodes of subsequent layers. Each node can have an activation function that includes a weighted sum of the inputs to the node which determines if the node is activated or how activated the node is. An artificial neural network may include bias parameters that can also strengthen or weaken the connection between nodes. An output layer of the neural network can produce a desired output such as, for example, an image by the generator, a label from the discriminator, a saliency map or human predicted label from model 420 or additional discriminator 522.

Training an artificial neural network can involve using an optimization algorithm to calculate the value of the weights and/or biases of the neural network to best map the given inputs (e.g., one or microphone signals, gaze direction, or other inputs described herein) to outputs (e.g., the extracted speech) by reducing a calculated loss of a loss function. The training of the machine learning model (adjusting the weights and/or biases to best reduce the loss) can include using a known optimization function. Loss is propagated back through the machine learning model, causing an adjustment of the weights and biases which control the neural network algorithm. This process occurs repeatedly for each input output pair, to adjust the weights such that the overall loss (which may also be referred to as error) is reduced. The same set of training data can be processed a plurality of times to refine the weights. The training can be completed once the loss is reduced to satisfy a threshold.

Figure 2:
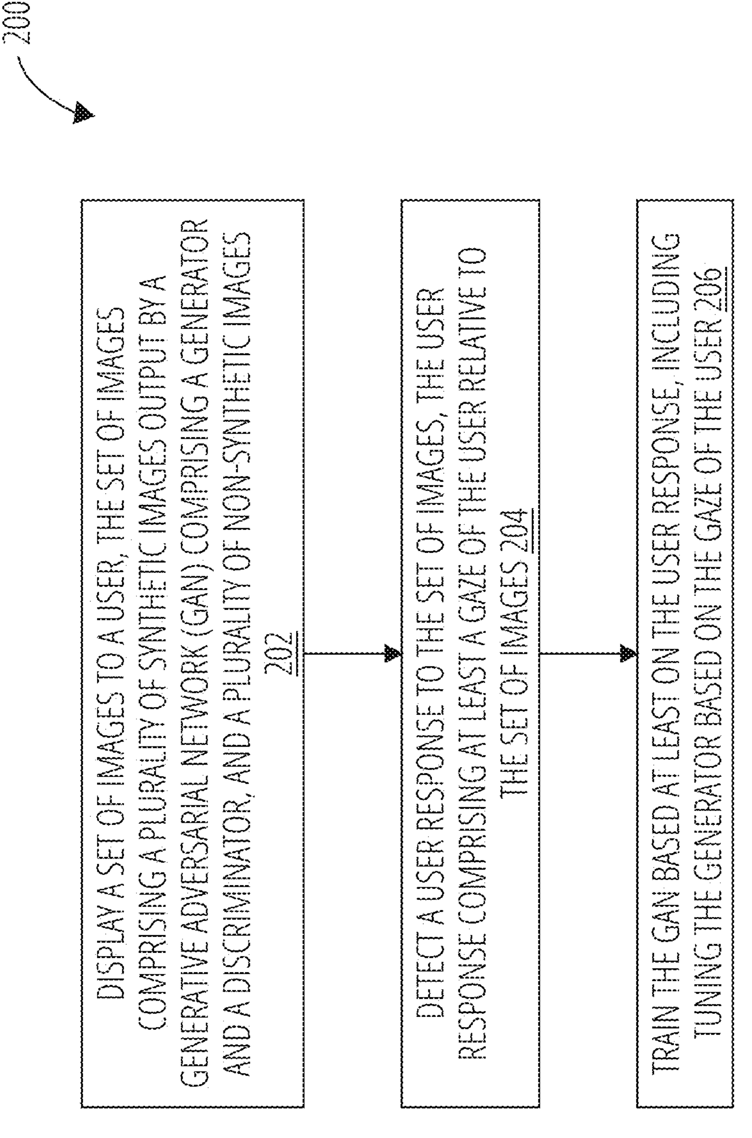
FIG. 2 illustrates an example method for enhancing a machine learning model using HITL, in accordance with one or more embodiments.

FIG. 2 illustrates an example method 200 for enhancing a machine learning model using HITL, in accordance with one or more embodiments. The method carried out by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

Method 200 illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in method 200 may be performed in an order different than presented, and that not all of the blocks in the method may be performed.

At block 202, processing logic display a set of images to a user, the set of images comprising a plurality of synthetic images output by a generative adversarial network (GAN) comprising a generator and a discriminator, and a plurality of non-synthetic images. The set of images, regardless of synthetic or real, may show (or attempt to show) an example of a target distribution (e.g., a human face, a cat, a dog, etc.).

At block 204, processing logic detects or senses a user response to the set of images, the user response comprising at least a gaze of the user relative to the set of images. In an embodiment, the user response further comprises a response of the user that indicates whether each image in the set of images is output by the GAN. In an embodiment, the user response further comprises an amount of time for the user to provide the response for each image in the set of images.

At block 206, processing logic trains the GAN based on the user response, including tuning the generator based on the gaze of the user.

In an embodiment, training the GAN based on the user response comprises generating a plurality of gaze saliency maps associated with the gaze of the user relative to the set of images. Processing logic tunes the generator based on the plurality of maps. In an embodiment, processing logic uses the plurality of maps to adjust weights of a loss function. Processing logic performs backpropagation to minimize loss of the loss function with the map-adjusted weights that increases penalty in one or more salient areas of the plurality of maps. During backpropagation, the generator is tuned by adjusting the weights and/or biases of the generator which reduces or minimizes the loss of the loss function (the map-adjusted loss function). An example of using saliency map data to adjust the loss function may be found, for example, FIG. 4.

Generally, it should be noted that weights of the loss function emphasize or de-emphasize different features (e.g., regions of a given image), while different weights of a model (e.g., the generator, discriminator) adjust how that model can reduce the loss calculated by the loss function.

Figure 4:
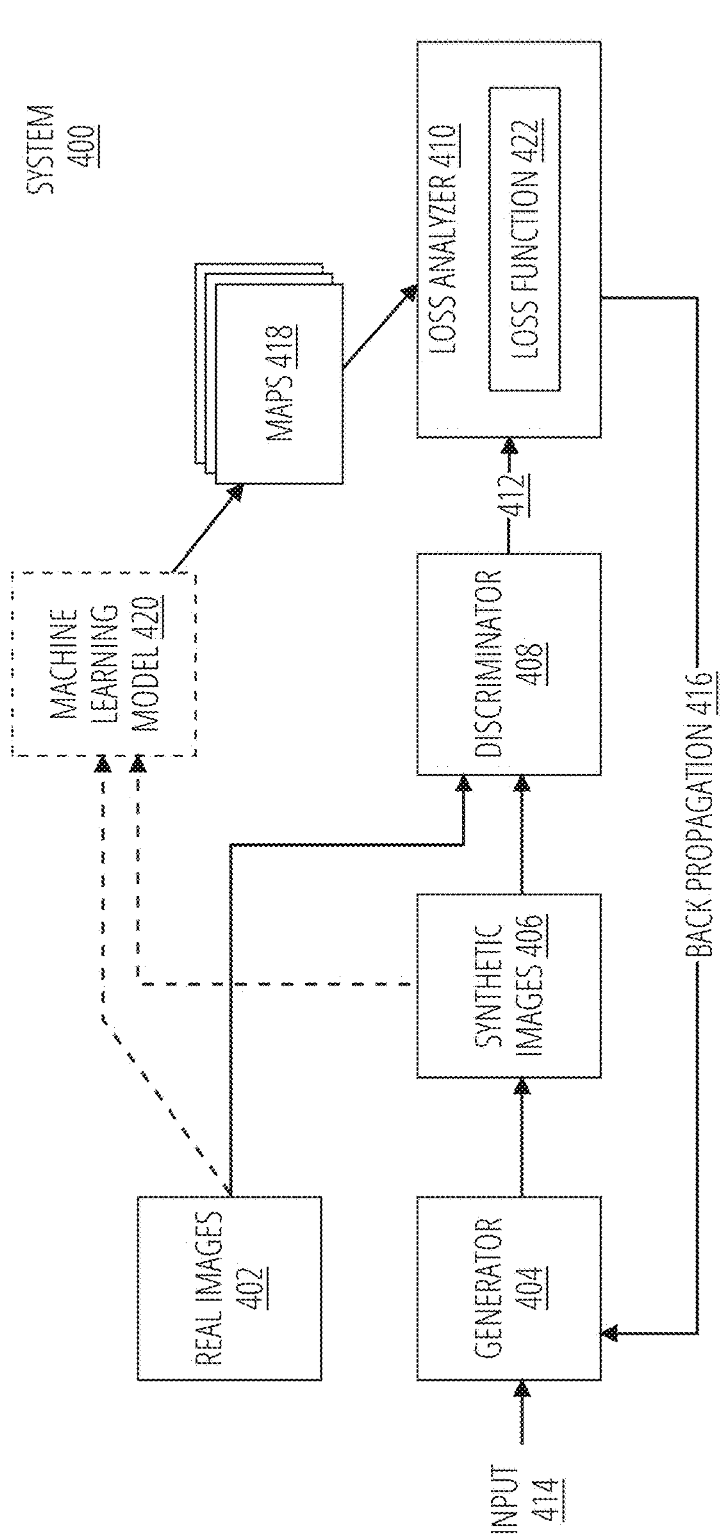
FIG. 4 shows an example system for tuning a GAN using response of a human, in accordance with one or more embodiments.

In an embodiment, processing logic further trains a machine learning (ML) model with the user response and the set of images. The ML model is trained to receive an input image and generate as output, a map that predicts the gaze of the user relative to the input image. Training the GAN based on the user response may include performing back-propagation which adjusts weights of the loss function which increases penalty in one or more salient areas of the map. This alternative embodiment is also shown in FIG. 4. The ML model may comprise a convolutional neural network.

Figure 5:
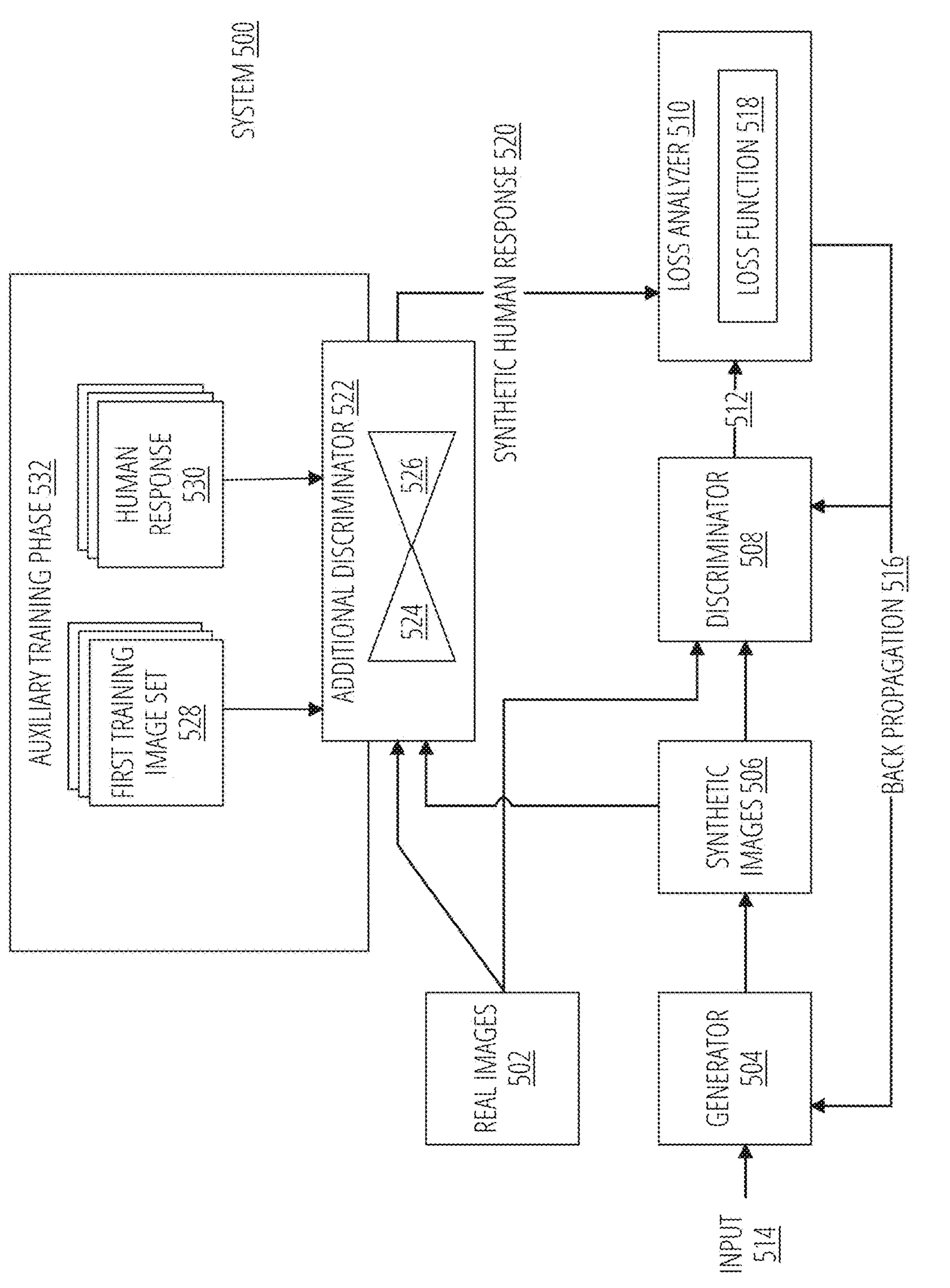
FIG. 5 shows an example system for training a GAN that includes an additional discriminator, in accordance with one or more embodiments.

In an embodiment, the GAN comprises a second discriminator. Processing logic trains the second discriminator with the set of images and the user response. The second discriminator is trained to receive an input image and generate, as output, a prediction of the gaze of the user relative to the input image. The second discriminator is also trained to generate a predicted response of the user indicating whether the input image is generated by the generator. In this embodiment, the GAN (with two discriminators) may be trained by providing as input to the discriminator and the second discriminator, a second set of images comprising a plurality of third images (e.g., synthetic images) generated from the generator and a fourth plurality of images (e.g., real images) not generated from the generator, and performing backpropagation between the generator and the discriminator, as well as second backpropagation between the generator and the second discriminator. Weights of the generator are thus tuned based on both discriminators. An example of a GAN with an additional discriminator is shown in FIG. 5.

In an embodiment, processing logic may perform this HITL training remotely (e.g., over the network). Processing logic may record the user response to the set of images which is performed at a first computing node. Processing logic receives the user response over a network at a second computing node, and trains the GAN at the second computing node (or a third computing node). In an embodiment, processing logic may repeat the method or other operations described periodically to update the GAN, using a plurality of user responses.

Figure 3:
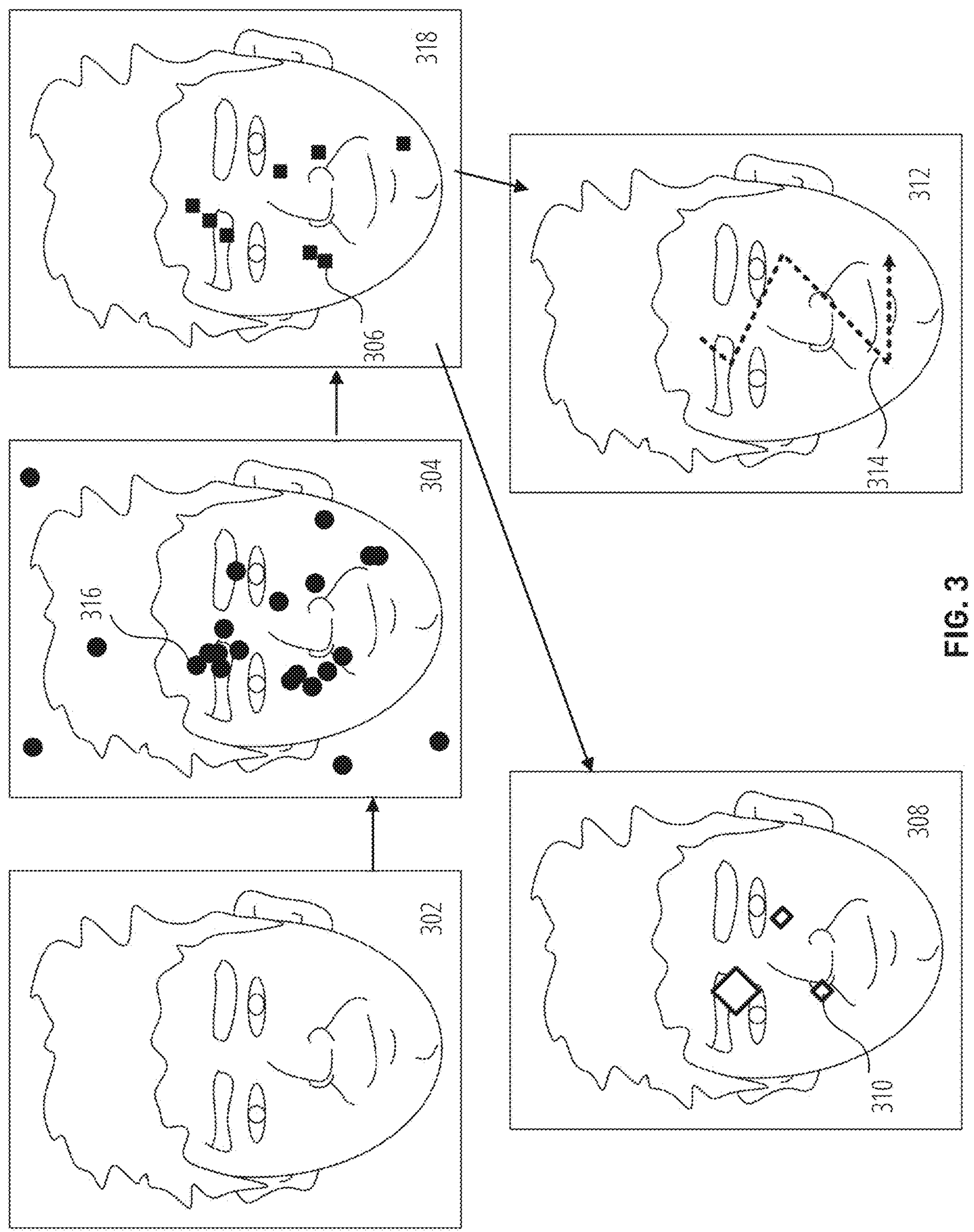
FIG. 3 shows an example generating a saliency map based on the collected user's reaction to a displayed image, in accordance with one or more embodiments.

FIG. 3 shows an example generating a saliency map based on the collected user's reaction to a displayed image, in accordance with one or more embodiments. The processing of the collected user's reaction (e.g., image processing) may be performed by system 100 or processing logic thereof.

For each image and user reaction, the system may generate a respective saliency map that captures which areas of the image the user concentrated their gaze on, for how long, and/or the path the user's gaze along the image.

The raw gaze data 110 collected while sensing the user as described in FIG. 1 may include tracked gaze points 316 of the user while looking at the image 302. These raw gaze data 304 may be processed into more usable format: heatmaps and scan paths for use in the following sections. Heat maps or scan paths may be referred to as maps or saliency maps. To convert the raw gaze data 304 into heatmaps/saliency maps, for an input image 302, $I_{input}$ the system may convert the eye gaze data 316 to fixation points 306 commonly represented as a set of fixation centers and the corresponding fixation duration:

$$FP=\{(x_1, y_1, dur_1), (x_2, y_2, dur_2), (x_3, y_3, dur_3), \ldots (x_n, y_n, dur_n)\}, \quad (3)$$

where, $x_i$ is the x co-ordinate of the i-th fixation point;

$y_i$ is the y co-ordinate of the i-th fixation point; and $dur_i$ is the duration corresponding to the $i^{th}$ fixation point, a longer duration would correspond to more heavily fixated gaze point.

The system may take the mapping of fixation points 306 on saliency map 318, and transformed this into a corresponding heatmap $I_{heatmap}$ 308. The system may generate heatmap 308 by representing the magnitude of the gaze at various regions 310 of the heatmap 308. The higher the duration of gaze at a given coordinate, the greater the magnitude is at that region of the heatmap 308. The gaze points are converted to fixations by one or more known algorithms (e.g., clustering) and each fixation point may be represented as a Gaussian weighted by the fixation duration in the heatmap.

Using the fixation points from 306, and corresponding saccade (eye movement) information sensed of the user for that image 302, the system may trace the gaze points with respect to time to generate one or more scan paths 314 on saliency map 312, that represent the user's gaze path relative to image 302.

As described, the system may use one or more of the saliency maps (e.g., the heatmap 308, the fixation points 306, the gaze path 314) to tune the GAN. For example, the system may use a set of images to train a model (e.g., GAN 116, GAN 404/408, etc.) with corresponding saliency maps that are associated with the gaze of the user relative to each one of the set of images. With enough images and corresponding data, a machine learning model 420 may be trained to predict a user's response to a given image, so that additional training data pairing an image and a user response may be synthesized and used to tune the GAN, to reduce the need to always obtain real user responses. This is further shown in FIG. 4.

FIG. 4 shows an example system 400 for tuning a GAN 116 using response of a human, in accordance with one or more embodiments. Generally, an input 414 may be provided to generator 404 to produce synthetic images 406 aimed at a target distribution. These synthetic images 124 are provided to discriminator 408 mixed with real images 402 of the same target distribution. Discriminator 408 is trained to determine an output label 412 that indicates whether the discriminator 408 deems that input to be real or synthetic. The generator 404 is tuned based on the plurality of maps 418 which adjusts weights of a loss function that increases penalty in one or more salient areas of the plurality of maps. To reduce the magnitude of loss function 422 (with the map-weights that emphasize loss at given coordinates), system 400 adjusts weights and/or biases of generator 404 in a process that may be referred to as backpropagation 416.

The system 400 may tune GAN (404, 408) using at least the maps 418. Maps 418 may be referred to as saliency maps that indicate regions of predicted gaze importance with respect to a corresponding image. For example, each of the maps 418 may correspond to one of the real images 402 or the synthetic images 406. The maps may include a value per pixel or x, y coordinate, where this value represents importance of human visual analysis of that image at that pixel. The maps may include a heatmap, a map of fixation points, a gaze path, or a combination thereof.

In an embodiment, if the amount of available training data (including human sensed reactions and maps 418) is above a threshold amount, maps 418 may be directly used to train the GAN (404, 408) on a per-image basis.

To reduce the need to always obtain new user responses, and to generate additional maps 418 to train the GAN, the system 400 may utilize a machine learning model 420 that is trained to predict maps 418 based on a given input image (e.g., 402, 406). This allows the system to train the GAN (404, 408) with less HITL training over time and maintaining a human-based prediction component during training.

At loss analyzer 410, the system evaluates a loss function 422 which, when training the generator 404, may include weights that penalize errors between the generator and discriminator (e.g., indicating generator's inability to fool the discriminator 408). In particular, the weights may correspond to coordinates or pixels of the image. Based on this loss, the system 400 may perform backpropagation 416 that includes modifying weights of generator 404 to reduce the loss of loss function 422.

Given an input $I_{input}$ (real or fake 3 channel RGB image) of M×N×3 dimensions, a model 420 (which may be CNN based) may be used to predict an output map, $SM_{pred}$ of M×N dimensions. In an embodiment, the machine learning model 420 may include a U-Net model. The predicted output image, $SM_{pred}$ may also be referred to as the predicted saliency map corresponding to $I_{input}$ and highlights regions of importance/areas having a higher probability of being looked at by a human during the real/fake discrimination task.

$$SM_{pred} = M_{saliency}(I_{input}), \tag{4}$$

where, $M_{saliency}$—model to predict saliency maps given an input image (U-Net)

The model 420 may be trained using Binary Cross Entropy loss or KL divergence loss. BCE loss at each pixel may be defined as:

$$l_{bce} = -(y_{true}\log(y_{pred}) + (1-y_{true})\log(1-y_{pred})), \tag{5}$$

where, $y_{pred}$ is the predicted probability—in this scenario, it would be pixel values of $I_{heatmap}$, $y_{true}$ is the ground truth score—in this scenario, it would be the heatmap obtained from the users. For an input image $I_{input}$ of dimension M×N, averaged over all the pixels, this loss may be determined as:

$$l_{bce} = -\sum_{i,j}^{M,N}\left(\begin{array}{l} I_{heatmap_{i,j}}\log\left(SM_{pred_{i,j}}\right)) + \\ \left(1-I_{heatmap_{i,j}}\right)\log\left(1-SM_{pred}\right)\end{array}\right) \tag{6}$$

Optionally, the loss function can be weighted with an inverted Gaussian centered at the image center to reduce the central fixation bias. The central fixation bias is the tendency for viewers to focus on the center of the screen more, especially in the initial moments of the task. This bias is important to regularize or filter out, so that the model 420 does not erroneously predict only the central fixation points and treat non-centered fixations as noise. In an embodiment, regularization is performed that weights the loss lower in the center with an inverted Gaussian, centered at the image center. This can be performed based on the following:

$$l_{bce} = -\sum\nolimits_{i,j}^{M,N} w_{i,j}\left[\left(I_{heatmap_{i,j}}\log\left(SM_{pred_{i,j}}\right)\right) + \left(1-I_{heatmap_{i,j}}\right)\log\left(1-SM_{pred}\right)\right)\right] \tag{7}$$

where, $w_{i,j}$ is the value of the inverted Gaussian at the pixel i, j which can be defined as:

$$w_{i,j} = 1 - \frac{1}{(1+k)}e^{-\frac{((i-i_c)^2+(j-j_c)^2)}{2\sigma^2}}, \tag{8}$$

where k>0 controls the weight of the Gaussian, a higher k value corresponds to a flatter Gaussian-bias regularization is lower.

With each image saliency map, the system 400 may finetune generator 404 using saliency maps 418. The system may use a per pixel discriminator such as one in UNetGAN. The final generator and discriminator loss (e.g., loss function 422) may apply a weight at each of the pixels of the image based on the saliency at that pixel of the maps 418, where a pixel with higher saliency is assigned with greater weight than a pixel with lower saliency, thus penalizing loss higher at regions of higher saliency (e.g., increased fixation duration, heatmap intensity, gaze sequence or gaze path, etc.). An example of a loss function 422 may be calculated as:

$$\min_G L_G = -\sum_z \sum_{i,j}^{M,N} \log\left(D(G(z))_{i,j}\right) \tag{9a}$$

$$\min_D L_d = -\sum_{x,z}\sum_{i,j}^{M,N}\left(\log\left(D(x)\right)_{i,j} + \log\left(1-D(G(z))_{i,j}\right)\right) \tag{10a}$$

where, $D(x)_{i,j}$—discriminator output at pixel location i, j $G(z)_{i,j}$—generator output at pixel location i, j.

The discriminator 408 may be trained with CutMix regularization or traditional means to enforce consistency regularization.

In an embodiment, the predicted saliency map $SM_{pred}$ (when maps 418 are generated by machine learning model 420) may be used to weight the generator discriminator losses for both the fake and real images before backpropagation. This may be expressed as the following:

$$\min_G L_G = -\sum_z \sum_{i,j}^{M,N} SM_{pred_z} \log\left(D(G(z))_{i,j}\right) \tag{9b}$$

$$\min_D L_d = -\sum_{x,z} \sum_{i,j}^{M,N} \left(SM_{pred_x} \log\,(D(x))_{i,j} + SM_{pred_z} \log\left(1 - D(G(z))_{i,j}\right)\right) \tag{10b}$$

This results in GAN losses in the salient areas being weighed more than the non-salient area, resulting in data distribution mismatches being penalized more in the salient areas. Such a GAN may produce more realistic image patches in the areas that are more salient to humans.

FIG. 5 shows an example system for training a GAN that includes an additional discriminator 522, in accordance with one or more embodiments.

As described, a GAN such as those described in other figures may include a single generator and a single discriminator. In an embodiment, the system 500 for tuning a GAN may comprise a second discriminator (additional discriminator 522) that improves tuning of a GAN.

During an auxiliary training phase 532, the additional discriminator 522 is trained with a set of images 528 which may include real and synthetic images, and the user human response 530 which may include on or more of a corresponding saliency map, the user feedback as to if the image is real or synthetic, the user reaction time to provide the feedback. The additional discriminator 522 may be trained with these inputs to using the human's feedback (real/fake) as the target output. The resulting trained additional discriminator 522 may receive a given input image, infer how a human would look at that image and whether the human would think it is real or synthetic. The additional discriminator 522 then generates, as output 520, a prediction of the gaze of the user relative to the input image, and a predicted response of the user indicating whether the input image is generated by the generator.

With the trained additional discriminator 522, the system 500 may train the GAN (including generator 504) based on the user response 520. The system 500 may provide input 514 to the generator 504 to generate a set of synthetic images 506. The input 514 may be associated with a target distribution matching that of real images 502 (e.g., a human face, a crosswalk, a fire hydrant, a bus, etc.). The input 514 may also provide some variation from the target distribution (e.g., a human face with wrinkles, a human face for a baby, a cross walk in an urban setting, a cross walk in a rural setting, etc.). The system 500 provides as input to the discriminator and the second discriminator, a set of images comprising synthetic images 506 generated from the generator and real images 502 not generated from the generator. System 500 performs backpropagation 516 which adjusts weights of the generator 504 based on loss (calculated at loss function 518 at block 510). The loss function 518 may include loss between the generator 504 and the discriminator 508, and loss between the generator 504 and the second discriminator 522. System 500 performs backpropagation 516 to adjust weights and/or biases of generator 504 to reduce or minimize the loss of the overall loss function 518. The loss function 518 may use the synthetic human response 520 to account for the loss between the generator 504 and additional discriminator 522, and discriminator label 512 to account for loss between the generator 504 and discriminator 508. Discriminator 508 is trained more traditionally through adversarial training iterations with generator 504 to tune weights of discriminator 508 to best generate output label 512 indicating whether the input image is synthetic or real.

In an example, the additional discriminator D' 522, which may also be referred to as a machine learning model $M_{gaze,h\text{-}label}$, may be trained using a training dataset and backpropagation. The additional discriminator 522 may be trained to receive an input image $I_{input}$. From this input, the additional discriminator 522 is trained to predict as output, an auxiliary human gaze response $$M^{dec}_{gaze,h-label} 526$$

and also the human response label $$M^{enc}_{gaze,h-label} 524.$$

The output 520 includes the predicted human gaze response 526.

In an example, to train this model, $M_{gaze,h\text{-}label}$, the training goal may be expressed as follows:

$$\min_{M_{gaze,h-label}} L\left(M^{dec}_{gaze,h-label}\left(\left(M^{enc}_{gaze,h-label}(I_{input})\right), HumanGaze\right) + l_{bce}\left(M^{enc}_{gaze,h-label}(I_{input}), Humanlabel\right) \tag{11}$$

where,

HumanGaze—this is any human gaze response, $I_{heatmap}$ or SP (ScanPath)

Humanlabel is the real/fake label in binary form or scoring format.

In an example, loss function L, may comprise a binary cross entropy (BCE) loss function if the chosen HumanGaze is expressed as a heatmap $I_{heatmap}$. In another example, the loss function L may comprise a Mean Squared Error (MSE) if the HumanGaze is expressed as a scanpath SP (ScanPath).

Once additional discriminator 522 is trained, output of this model may be used in the system as an additional discriminator to further finetune the GAN, as shown.

At loss analyzer 510, the final generator and discriminator loss (loss function 518) may penalize error between the generator 504 and discriminator 150, as well as between the generator 504 and additional discriminator 522 (e.g., whether the generator is able to fool the additional discriminator 522). In an example, the loss function 518 may be calculated as:

$$\min_G L_G = -\sum_z \sum_{i,j}^{M,N} \log\left(D(G(z))_{i,j}\right)\Big) - \sum_z \log\left(M^{enc}_{gaze,h-label}(G(z))\right) \tag{12}$$

$$\min_D L_d = -\sum_{x,z} \sum_{i,j}^{M,N} \left(\log\,(D(x))_{i,j} + \log\left(1 - D(G(z))_{i,j}\right)\right) \tag{13}$$

where, $D(x)_{i,j}$—discriminator output at pixel location i, j $G(z)_{i,j}$—generator output at pixel location i, j.

In an example, additional discriminator 522 gaze model comprise two separate models. For example, a gaze model and a label model. In such case, the predicted human label is not directly dependent upon the input image $I_{input}$ and may provide stability in some training scenarios.

Here, HumanGaze=$M_{gaze}(I_{input})$ and, HumanLabel=$M_{h\text{-}label}(I_{input})$.

In doing so, this model 522 can be trained very similarly as $M_{gaze,h\text{-}label}$ with the slight alterations as below.

$$\min_{M_{gaze}} L(M_{gaze}(I_{Input}), HumanGaze), \tag{14}$$

$$\min_{M_{h-label}} L(M_{h-label}(M_{gaze}(I_{input})), HumanLabel) \tag{15}$$

Regardless of if additional discriminator 522 includes separate models ($M_{gaze}$ and $M_{h\text{-}label}$) or a single model, the GAN fine-tuning remains the same at loss analyzer 510 and performing backpropagation 516 to adjust weights of generator 504 to reduce the loss of loss function 518. The difference may be accounted for with respect to equation 12 above, where $M_{h\text{-}label}$ replaces $$M^{enc}_{gaze,h-label}$$

as the term.

In our embodiment, we have described a system where we collect human data and finetune the generative model as a single step. A natural extension could be to do multi-step finetuning as part of the training procedure, where the data collection can also be done online (e.g., via AWS/Amazon Mechanical Turk) periodically, so that the model can be fine-tuned and improved regularly. Depending on the scale of these operations, it may be viable to use the training data directly instead of the intermediate saliency map creator or gazer creator.

Figure 6:
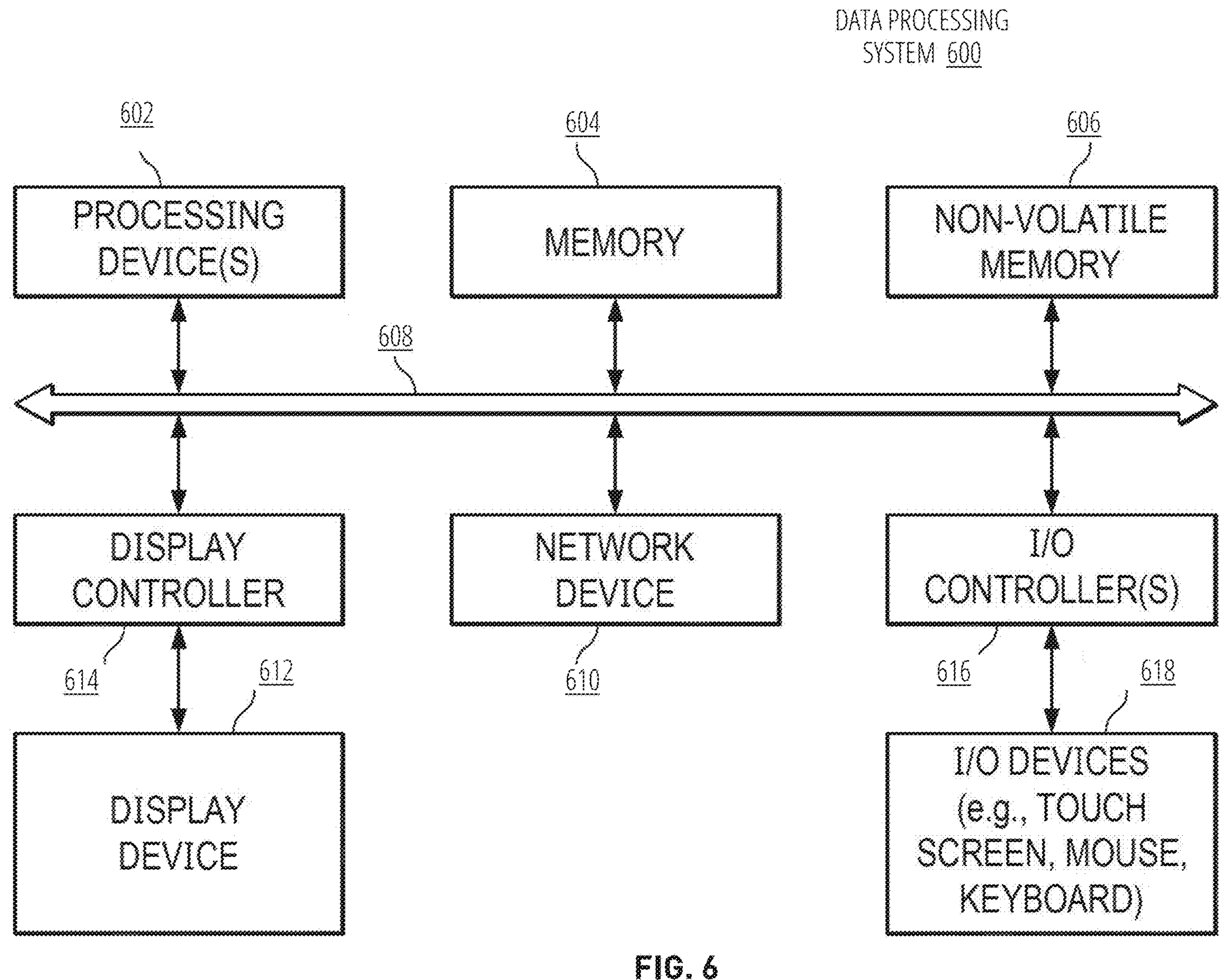
FIG. 6 shows an example of a data processing system that can be used to provide one or more embodiments described.

FIG. 6 shows an example of a data processing system 600 that can be used to provide one or more embodiments described herein. The systems and methods described herein can be implemented in a variety of different data processing systems and devices, including general-purpose computer systems, special purpose computer systems, or a hybrid of general purpose and special purpose computer systems. Data processing systems that can use any one of the methods described herein include a camera, a smartphone, a set top box, a computer, such as a laptop or tablet computer, embedded devices, game systems, and consumer electronic devices, etc., or other electronic devices.

FIG. 6 is a block diagram of data processing system hardware according to an embodiment. Note that while various components of a data processing system are illustrated, it is not intended to represent any particular architecture or manner of interconnecting the components as such details are not germane to the present invention. It will also be appreciated that other types of data processing systems that have fewer components than shown or more components than shown in FIG. 6 can also be used with one or more embodiments of the present invention.

As shown, the data processing system 600 includes one or more buses 1209 that serve to interconnect the various components of the system. The system 600 can include a camera or be coupled to a camera. One or more processing devices 602 are coupled to the one or more buses 608 as is known in the art. A processing device may comprise a central processing unit (CPU), a microcontroller, a digital signal processor, a graphical processing unit (GPU), or other processing device or combination thereof. Memory 604 may be DRAM or non-volatile RAM or may be flash memory or other types of memory or a combination of such memory devices. This memory is coupled to the one or more buses 608 using techniques known in the art. The data processing system can also include non-volatile memory 606, which may be a hard disk drive or a flash memory or a magnetic optical drive or magnetic memory or an optical drive or other types of memory systems that maintain data even after power is removed from the system. The non-volatile memory 606 and the memory 604 are both coupled to the one or more buses 608 using known interfaces and connection techniques. A display controller 614 is coupled to the one or more buses 608 in order to receive display data to be displayed on a display device 612 which can be one of displays. The data processing system 600 can also include one or more input/output (I/O) controllers 616 which provide interfaces for one or more I/O devices, such as one or more cameras, touch screens, ambient light sensors, and other input devices including those known in the art and output devices (e.g., speakers). The input/output devices 618 are coupled through one or more I/O controllers 616 as is known in the art.

While FIG. 6 shows that the non-volatile memory 606 and the memory 604 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 608 can be connected to each other through various bridges, controllers and/or adapters as is well known in the art. In one embodiment the I/O controller 616 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 610 can be coupled to the bus(es) 608. The network device(s) 610 can be wired network devices (e.g., Ethernet) or wireless network devices (e.g., Wi-Fi, Bluetooth) that receive images from a camera, etc.

Although separate embodiments are enumerated below, it will be appreciated that these embodiments can be combined or modified, in whole or in part, into various different combinations. The combinations of these embodiments can be any one of all possible combinations of the separate embodiments.

Embodiment 1 is a method comprising: displaying a set of images to a user, the set of images comprising a plurality of synthetic images output by a generative adversarial network (GAN) comprising a generator and a discriminator, and a plurality of non-synthetic images; detecting a user response to the set of images, the user response comprising at least a gaze of the user relative to the set of images; and training the GAN based at least on the user response, including tuning the generator based on the gaze of the user.

Embodiment 2 is a method of embodiment 1, wherein training the GAN based on the user response comprises generating a plurality of maps associated with the gaze of the user relative to the set of images; and tuning the generator based on the plurality of maps.

Embodiment 3 is a method of embodiment 2, wherein tuning the generator based on the plurality of maps comprises performing backpropagation which adjusts weights of the generator in view of a loss function that has increased penalty in one or more salient regions of the plurality of maps.

Embodiment 4 is a method of embodiment 1, further comprising training a machine learning (ML) model with the user response and the set of images, the ML model being trained to receive an input image and generate as output, a map that predicts the gaze of the user relative to the input image, wherein training the GAN based on the user response comprises performing backpropagation which adjusts weights of the generator in view of a loss function that increases penalty in one or more salient regions of the map.

Embodiment 5 is a method of embodiment 4, wherein the ML model comprises a convolutional neural network.

Embodiment 6 is a method of embodiment 1, wherein the user response further comprises a response of the user in indicating whether each image in the set of images is output by the GAN.

Embodiment 7 is a method of embodiment 6, wherein the user response further comprises an amount of time for the user to provide the response for each image in the set of images.

Embodiment 8 is a method of embodiment 1, wherein the GAN comprises a second discriminator, wherein the second discriminator is trained with the set of images and the user response to receive an input image and generate, as output, a prediction of the gaze of the user relative to the input image, and a predicted response of the user indicating whether the input image is generated by the generator.

Embodiment 9 is a method of embodiment 8, wherein training the GAN based on the user response comprises providing as input to the discriminator and the second discriminator, a second set of images comprising a plurality of third images generated from the generator and a fourth plurality of images not generated from the generator, and performing backpropagation which adjusts weights of the generator based on loss between the generator and the discriminator and based on loss between the generator and the second discriminator.

Embodiment 10 is a method of embodiment 1, wherein detecting the user response to the set of images is performed at a first computing node, and the user response is received over a network at a second computing node where the GAN is trained.

Embodiment 11 is a method of embodiment 10, wherein the method is performed periodically to update the GAN using a plurality of user responses.

Embodiment 12 is an apparatus comprising a processing system and memory and configured to perform any one of the methods in embodiments 1-11.

Embodiment 13 is a non-transitory machine-readable storage storing executable program instructions which when executed by a machine cause the machine to perform any one of the methods of embodiments 1-11.

It will be apparent from this description that one or more embodiments of the present invention may be embodied, at least in part, in software. That is, the techniques may be carried out in a data processing system in response to its one or more processors executing a sequence of instructions contained in a storage medium, such as a non-transitory machine-readable storage medium (e.g., DRAM or flash memory). In various embodiments, hardwired circuitry may be used in combination with software instructions to implement the present invention. Thus, the techniques are not limited to any specific combination of hardware circuitry and software, or to any particular source for the instructions executed by the data processing system.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A method comprising:

displaying a set of images to a user, the set of images comprising a plurality of non-synthetic images, and a plurality of synthetic images output by a generative adversarial network (GAN) comprising a generator machine learning model (generator), a first discriminator machine learning model (discriminator) and a second discriminator;

detecting a user response to the set of images, the user response comprising at least a gaze of the user relative to the set of images; and training the GAN's generator and the first discriminator based at least on the user response, including tuning the generator based on the gaze of the user, wherein the second discriminator is trained with the set of images and the user response to receive an input image and generate, as output, a prediction of the gaze of the user relative to the input image, and a predicted response of the user indicating whether the input image is generated by the generator.

2. The method of claim 1, wherein training the GAN based on the user response comprises generating a plurality of maps associated with the gaze of the user relative to the set of images; and tuning the generator based on the plurality of maps.

3. The method of claim 2, wherein tuning the generator based on the plurality of maps comprises performing backpropagation which adjusts weights of the generator in view of a loss function that has increased penalty in one or more salient regions of the plurality of maps.

4. The method of claim 1, further comprising training a machine learning (ML) model with the user response and the set of images, the ML model being trained to receive an input image and generate as output, a map that predicts the gaze of the user relative to the input image, wherein training the GAN based on the user response comprises performing backpropagation which adjusts weights of the generator in view of a loss function that increases penalty in one or more salient regions of the map.

5. The method of claim 4, wherein the ML model comprises a convolutional neural network.

6. The method of claim 1, wherein the user response further comprises a response of the user in indicating whether each image in the set of images is output by the GAN.

7. The method of claim 6, wherein the user response further comprises an amount of time for the user to provide the response for each image in the set of images.

8. The method of claim 1, wherein training the GAN based on the user response comprises providing as input to the first discriminator and the second discriminator, a second set of images comprising a plurality of third images generated from the generator and a fourth plurality of images not generated from the generator, and performing backpropagation which adjusts weights of the generator based on loss between the generator and the first discriminator and based on loss between the generator and the second discriminator.

9. The method of claim 1, detecting the user response to the set of images is performed at a first computing node, and the user response is received over a network at a second computing node where the GAN is trained.

10. The method of claim 9, wherein the method is performed periodically to update the GAN using a plurality of user responses.

11. A system, comprising:

a processor; and a memory storing instructions that, when executed by the processor, configure the system to:

display a set of images to a user, the set of images comprising a plurality of non-synthetic images, and a plurality of synthetic images output by a generative adversarial network (GAN) comprising a generator machine learning model (generator), a first discriminator machine learning model (discriminator), and a second discriminator;

detect a user response to the set of images, the user response comprising at least a gaze of the user relative to the set of images; and train the GAN's generator and the first discriminator, based at least on the user response, including to tune the generator based on the gaze of the user, wherein the second discriminator is trained with the set of images and the user response to receive an input image and generate, as output, a prediction of the gaze of the user relative to the input image, and a predicted response of the user indicating whether the input image is generated by the generator.

12. The system of claim 11, wherein training the GAN based on the user response comprises to generate a plurality of maps associated with the gaze of the user relative to the set of images; and tuning the generator based on the plurality of maps.

13. The system of claim 12, wherein tuning the generator based on the plurality of maps comprises to perform backpropagation which adjusts weights of the generator in view of a loss function that has increased penalty in one or more salient regions of the plurality of maps.

14. The system of claim 11, wherein the instructions further configure the system to train a machine learning (ML) model with the user response and the set of images, the ML model being trained to receive an input image and generate as output, a map that predicts the gaze of the user relative to the input image, wherein training the GAN based on the user response comprises performing backpropagation which adjusts weights of the generator in view of a loss function that increases penalty in one or more salient regions of the map.

15. A non-transitory computer-readable storage medium, the computer-readable storage medium including instructions that when executed by a computer, cause the computer to:

display a set of images to a user, the set of images comprising a plurality of non-synthetic images, and a plurality of synthetic images output by a generative adversarial network (GAN) comprising a generator machine learning model (generator), a first discriminator machine learning model (discriminator) and a second discriminator;

detect a user response to the set of images, the user response comprising at least a gaze of the user relative to the set of images; and train the GAN's generator and the first discriminator based at least on the user response, including to tune the generator based on the gaze of the user, and train the second discriminator with the set of images and the user response to receive an input image and generate, as output, a prediction of the gaze of the user relative to the input image, and a predicted response of the user indicating whether the input image is generated by the generator.

16. The computer-readable storage medium of claim 15, wherein training the GAN based on the user response comprises to generate a plurality of maps associated with the gaze of the user relative to the set of images; and to tune the generator based on the plurality of maps.

17. The computer-readable storage medium of claim 16, wherein tuning the generator based on the plurality of maps comprises to perform backpropagation which adjusts weights of the generator in view of a loss function that has increased penalty in one or more salient regions of the plurality of maps.

18. The computer-readable storage medium of claim 15, wherein the instructions further configure the computer to train a machine learning (ML) model with the user response and the set of images, the ML model being trained to receive an input image and generate as output, a map that predicts the gaze of the user relative to the input image, wherein training the GAN based on the user response comprises performing backpropagation which adjusts weights of the generator in view of a loss function that increases penalty in one or more salient regions of the map.

19. The computer-readable storage medium of claim 18, wherein the ML model comprises a convolutional neural network.

* * * * *